United States Patent

[11] 3,631,945

| [72] | Inventor | Giorgio Ollearo<br>Ivrea, Italy |
| [21] | Appl. No. | 42,812 |
| [22] | Filed | June 2, 1970 |
| [45] | Patented | Jan. 4, 1972 |
| [73] | Assignee | Ing. C. Olivetti & Co. S.p.A.<br>Ivrea (Turin), Italy |
| [32] | Priority | June 9, 1969 |
| [33] | | Italy |
| [31] | | 52154 A/69 |

[54] SPEED-CHANGING DEVICE FOR A ROTARY MEMBER
11 Claims, 3 Drawing Figs.

[52] U.S. Cl. .................................................. 192/3.51,
74/325, 74/337.5, 74/346
[51] Int. Cl. ..................................................... F16d 67/00,
F16h 5/06, F16h 3/22
[50] Field of Search............................................. 74/325,
335, 337.5, 346, 364; 192/3.51

[56] References Cited
UNITED STATES PATENTS

| 2,587,004 | 2/1952 | Siegrist ........................ | 192/3.51 |
| 1,462,675 | 7/1923 | Whittington ................ | 74/325 |
| 2,835,136 | 5/1958 | Berthiez ...................... | 74/346 X |
| 3,429,194 | 2/1969 | Espenschied et al. ........ | 74/337.5 |

*Primary Examiner*—Arthur T. Mckeon
*Attorney*—Birch, Swindler, McKie & Beckett

ABSTRACT: A speed-changing device for a machine tool spindle comprises two driven gears of different diameters secured to the spindle, two driving gears for meshing with respective ones of the driven gears and angularly fixed relative to each other, the spindle being orientable in a predetermined angular position. The driving gears are axially slidable with respect to the driven gears for selecting which of the two pairs of driven and driving gears is in mesh. The gear ratios are such and the fixed angular relationships between the driven gears and between the driving gears are such that one gear of each said pair has a tooth aligned exactly with a space of the other gear of the pair. The two driving gears have an overall axial length greater than the axial clearance between the other two gears whereby, when changing speed, one pair of gears commences to mesh before the other pair has ceased to mesh.

INVENTOR.
GIORGIO OLLEARO

PATENTED JAN 4 1972

INVENTOR.
GIORGIO OLLEARO 3,631,945

SPEED-CHANGING DEVICE FOR A ROTARY MEMBER

REFERENCE TO RELATED APPLICATION

Applicant claims priority from corresponding Italian application Ser. No. 52154-A/69 filed June 9, 1969.

BACKGROUND OF THE INVENTION

1. Field of the Invention

The present invention relates to a speed-changing device for a rotary member, e.g. a machine tool spindle, which can be oriented in a predetermined angular position by an orienting means.

2. Description of the Prior Art

Normally, the changing of the speed of a machine tool spindle is obtained by selectively engaging given sets of gears through electromagnetic friction clutches, which have the disadvantage of slipping at the beginning and are subject to damage due to the flow of current through the same and to the phenomenon of residual magnetism.

SUMMARY OF THE INVENTION

The object of the present invention is to effect the change in speed with the spindle or other rotary member in a predetermined position without the necessity for slipping connections for synchronizing the gears.

According to the invention there is provided a changing-speed device comprising a driven rotary member carrying two driven gears of different diameters and which are angularly fixed relative to the rotary member, two driving gears for meshing with a respective ones of the driven gears and which are angularly fixed relative to each other, means for orienting the rotary member in a predetermined angular position when the driving gears are stationary, and means for producing a relative axial shifting between the driving gears and the driven gears for selecting which of the two pairs of driven and driving gears is in mesh, the gear ratios being such and the fixed angular relationships between the driven gears and between the driving gears being such that, when the rotary member is oriented in the predetermined angular position, one gear of each said pair has a tooth aligned exactly with a space of the other gear of the pair.

A preferred embodiment of the invention will now be described, by way of example, with reference to the accompanying drawings.

DESCRIPTION OF THE PREFERRED EMBODIMENTS

Figure 1:
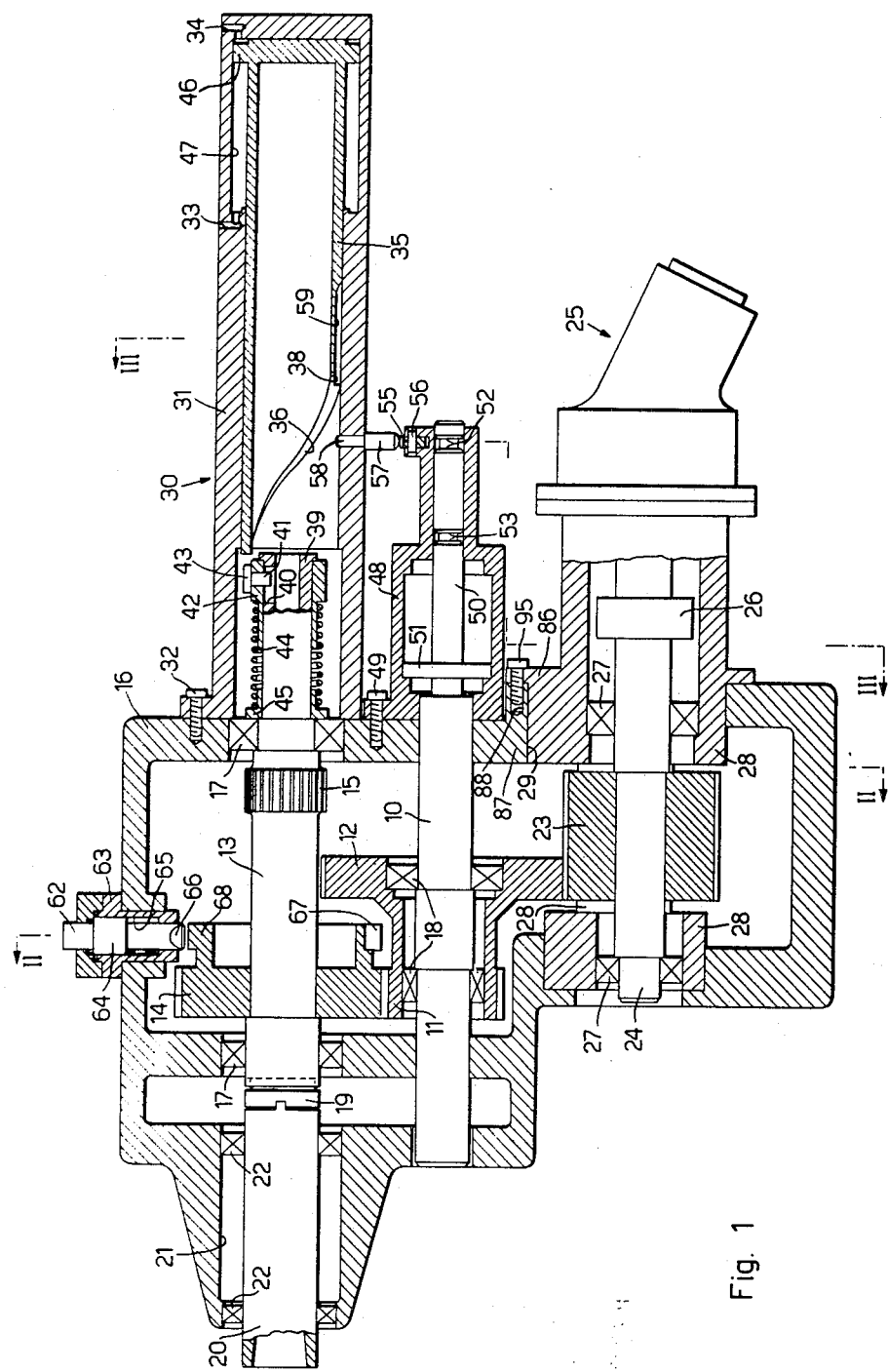
FIG. 1 is a partial longitudinal section of part of a machine tool including a speed-changing device for its spindle.

Referring to FIG. 1, the speed-changing device includes a shaft 10 on which there are mounted two driving gears 11 and 12 which are integral and have different diameters. Parallel to the shaft 10 there is arranged a driven shaft 13 on which there are fixed two driven gears 14 and 15 with which the two driving gears 11 and 12 can mesh alternately, the shaft 10 being axially movable for this purpose.

The axial clearance between the gears 14 and 15 is smaller than the overall axial length of the gears 11 and 12 so that, when changing gear, one pair of gears 11 and 14 or 12 and 15 begins to mesh before the gears forming the other pair have become fully disengaged, so that the relative orientation of the gears does not change.

The shafts 10 and 13 are supported by a fixed casing 16. The shaft 13 is mounted in bearings 17 and can rotate about its own axis, but the shaft 10 can only shift axially, carrying with it the gears 11 and 12 which, being mounted in bearings 18, can rotate with respect to the shaft 10. One end of the shaft 13 is connected through a dog coupling 19 to a tool spindle 20 which is housed in a cavity 21 of the casing 16 and is rotatable in two bearings 22.

The gears 11 and 12 are driven directly from a pinion 23, the teeth of which are constantly in mesh with those of the gear 12. The pinion 23 is mounted on a driving shaft 24 and is actuated by a hydraulic motor 25 through a clutch 26 known per se located between the motor 25 and the pinion 23. The shaft 24 is mounted in bearings 27 arranged in a support 28 housed in an opening 29 formed in the lower part of the casing 16.

The shaft 13 is adapted to be oriented in a predetermined angular position by an orienting device 30 which can be actuated when the clutch 26 is open, i.e. disengaged, and the shaft 24 is therefore stationary, this orienting device being substantially of the type described in the U.S. Pat. application Ser. No. 748,534, now abandoned, filed July 29, 1968. More particularly, the orienting device 30 is arranged coaxially with the shaft 13 and includes a substantially cylindrical chamber 31 which is hollow internally and is rendered fast with the casing 16 by means of screws 32. The chamber 31 is provided with two ducts 33 and 34 which allow the passage of fluid under pressure. Inside the chamber 31 there is mounted a cylinder 35 axially movable but not rotatable within the chamber 31, and having at one end two spiral edges 36 and 37 converging into a central slot 38.

The shaft 13 has one end 39 thereof housed inside the chamber 31, this end being provided with a slot 40 in which a pin 41 is arranged. The pin is fixed to a sleeve 42 and carries a roller 43 adapted to cooperate with the spiral edges 36 and 37 and to be housed in the slot 38. A compression spring 44 allows a certain axial displacement between the sleeve 42 and a fixed collar 45. A piston 46 formed at one end of the cylinder 35 and adapted to be shifted inside a cylindrical cavity 47 formed in chamber 31.

The axial shifting of the shaft 10 is obtained by means of an hydraulic system including an internally hollow cylinder 48 fixed to the casing 16 by means of screws 49. On the shaft 10 and on the same axis there is fixed a rod 50 on which there is keyed a piston 51 adapted to slide within the cylinder 48. The rod 50 is provided with two annular grooves 52 and 53 in which an arm 54 of an angle lever 55 (FIG. 3) can engage. The lever 55 is pivoted on a pin 56 and is operated by a pin 57, one end 58 of which is normally engaged in a groove 59 formed in the outer surface of the cylinder 35. A compression spring 50 and a pin 61 hold the lever 55 constantly against the base of the groove 52 or 53 and the pin 57 in the high position.

In the upper part of the casing 16 there is arranged a positioning member adapted to be actuated following the actuation of the orienting device 30 to effect a rectification or fine adjustment of the angular position of the spindle 20. The positioning member is constituted by a rod 62 (FIG. 2) slidable in a bush 63 and actuated by an hydraulic unit constituted substantially by a plunger 64 fast with the rod 62 and a cavity 65 formed in the bush 63. One end 66 of the rod 62 is wedged shaped and is adapted to be wedged in a V-shaped notch 67 formed in a wheel 68 integral with the gear 14. The notch 67 is formed in an angular position such that when the spindle is oriented by the device 30 it is substantially in correspondence with the end 66 of the rod 62.

The gears 11, 12, 14 and 15 have numbers of teeth and transmission ratios such that, during the changing of the speed, after the orientation of the shaft 13, they are able to present at least one tooth of a driven gear in correspondence with a space of the corresponding driving gear. To this end, the transmission ratios between the driving gears 11 and 12 and the driven gears 14 and 15 are a whole multiple of the other. Moreover, each gear has a number of teeth divisible by the ratio between the two transmission ratios. More particularly, the gear 11 has 28 teeth, the gear 12 has 98 teeth, the gear 14 has 56 teeth and the gear 15 also has 28 teeth. transmission ratio between the gear 11 and the gear 14 is 0.5, while that between the gear 12 and the gear 15 is 3.5. The ratio between the transmission ratios is 7 and is divisible into the numbers of teeth of the gears 11, 12, 14 and 15. Moreover, the gears 11 and 12 are formed in such manner as to have a space 69 of one aligned with a space 70 of the other.

Figure 2:
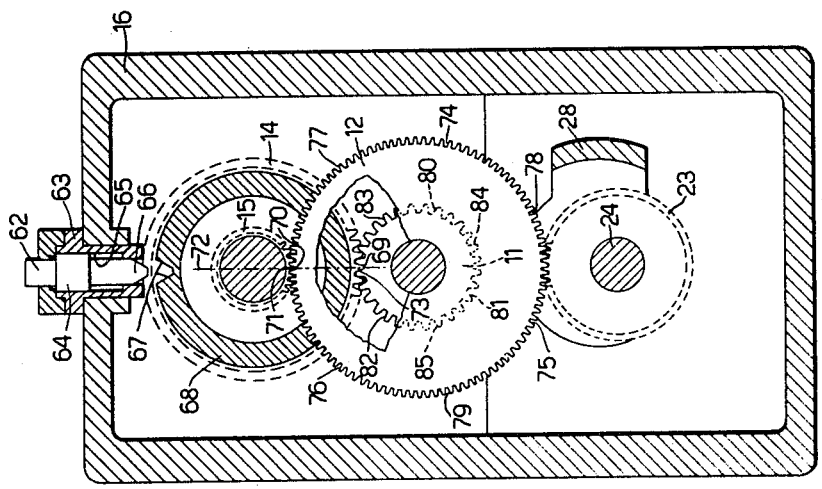
FIG. 2 is a section of the device on the line II—II of FIG. 1 in a working position.

When the shaft 13 is oriented as shown in FIG. 2, the gear 15 always has one of its teeth 71 in the position in which meshing with the gear 12 normally takes place and which lies in the plane represented by the chain-dotted line 72. At the same time, the gear 14 presents one of its teeth 73 in the position in which meshing with the gear 11 normally takes place, that is on the line 72. Owing to the transmission ratio obtaining between the gear 12 and the gear 14 when the gears 11 and 14 are in mesh, the tooth 71 comes into correspondence with either the space 70 or one of the spaces 74, 75, 76, 77, 78, 79 of the gear 12 which are spaced from one another by one-seventh of a revolution. If, when meshing begins, the tooth 71 encounters the space 70, after one revolution of the gear 15 it will encounter the space 74, after two revolutions the space 75, after three revolutions the space 76, and so on, to reencounter the space 70 after seven revolutions.

Finally, in addition to the gear 11 presenting its space 69 in phase with the space 70 of the gear 12, it presents the spaces 80, 81, 82, 83, 84 and 85 in phase with the spaces 74, 75, 76, 77, 78 and 79, respectively, of the gear 12.

The device operates in the following manner.

FIG. 1 shows the device set for obtaining the lower speed. The rotation of the driving shaft 24 is transmitted to the shaft 13 through the pinion 23 which meshes with the gear 12 and through the gear 11 which meshes with the gear 14.

If it is desired to change to the higher speed, after disengaging the clutch 26 the shaft 13 is oriented by actuating the orienting device 30. Fluid under pressure is delivered through the duct 34; the piston 46 shifts the cylinder 35 towards the end 39 of the shaft 13. The roller 43 is engaged by the edge 36 or the edge 37 and rotated until it engages the slot 38, thus assuming the prefixed angular position. The shaft 13, rotated by the pin 41, will also be oriented together with the spindle 20.

When the cylinder 35 has shifted fully to the left, the pin 57 is displaced downwardly, because its end 58 is depressed forcibly by the radiused right-hand end of the groove 59. The pin 57 then causes the lever 55 (FIG. 3) to rotate clockwise until its arm 54 is disengaged from the annular groove 52, thus allowing the rod 50 to be able to effect its stroke to the right.

The fluid under pressure is now delivered to the upper chamber of the bush 63. The plunger 64 causes the rod 62 to descend until its end 66 engages the notch 67, effecting a rectification of the angular position of the spindle 20. This subsequent rectification of the angular position of the spindle 20 permits the execution of operations, such as broaching and rough shaping, in which high-precision spindle orientation is required.

The fluid under pressure is now delivered to the left-hand chamber of the cylinder 48 (FIG. 1), thus effecting the axial shifting on the shaft 10 and, therefore, of the gears 11 and 12. The gear 12 presents one of its spaces 70, 74, 75, 76, 77, 78, 79 in correspondence with the tooth 71 (FIG. 2) of the gear 15, as a result of which meshing is effected safely before the gear 14 is disengaged form the gear 11. In fact, if one of the spaces 69, 80, 81, 82, 83, 84, 85 of the gear 11 is engaged by the tooth 73 of the gear 14, owing to the special angular keying of the gears 11 and 12, once the shaft 13 has been oriented, the tooth 71 of the gear 15 likewise finds in correspondence with it one of the spaces 70, 74, 75, 76, 77, 78, 79 of the gear 12.

When the meshing of the gears 15, 12 has taken place fully, the annular groove 53 (FIG. 1) of the rod 50 is located in correspondence with the arm 54 of the lever 55. The cylinder 35 is then caused to return to the starting position by delivering fluid under pressure to the duct 33 and the rod 62 is disengaged form the notch 67. As soon as the groove 59 is brought above the end 58 of the pin 57, the pin is no longer locked. The lever 55 (FIG. 3), urged by the spring 60, now turns anticlockwise and engages in the groove 53 (FIG. 1). The clutch 26 can then be engaged again.

If, when the gear 12 (FIG. 1) is in mesh with the gear 15, it is desired to return to engaging the gear 11 with the gear 14, the operations of orientation of the shaft 13 which have already been described will be repeated. The shaft 10 is thereafter caused to shift axially to the left. After the orientation, the tooth 73 of the gear 14 will be opposite one of the spaces 69, 80, 81, 82, 83, 84, 85 of the gear 11, since the tooth 71 of the gear 15 is in engagement with one of the spaces 70, 74, 75, 76, 77, 78, 79 of the gear 12.

It is therefore clear that the driven gears 14 and 15 and the driving gears 11 and 12 are keyed angularly in such manner that, when the shaft 13 is oriented, during the axial shifting of the gears 11 and 12 for alternating the meshing, a space of each driving gear 11 and 12 lines up with a tooth of each of the driven gears 14 and 15.

For the purpose of being able to vary the range of speeds of the change speed gear, the support 28 includes a disc 86 (FIG. 3) which is eccentric with respect to the axis of the shaft 24 and adapted to be fixed to the casing 16 in a variable angular position, so as to permit interchangeability of the pinion 23 with other pinions of different diameter. In a part 87 of the casing 16 there are formed three threaded holes 88, 89 and 90 (FIG. 3) having different angular distances between them and having their centers lying on a circumference concentric with the opening 29. Four sets of holes 91, 92, 93 and 94 each composed of three holes are formed in the disc 86. The angular distance between the holes of each set is equal to that between the holes 88, 89 and 90, so that each set of holes 91, 92, 93 and 94 can be placed in correspondence with the three threaded holes 88, 89 and 90 in a single orienting action. By means of screws 95 the disc 86 is thus clamped to the casing 16 in one of the four possible positions.

In order to choose the speed range, the user must position the support 28 so that there is disposed in correspondence with the threaded holes 88, 89 and 90 that series of holes 91, or 92, or 93, or 94 which is such that the pinion 23 corresponding to the speed range selected can be mounted on the shaft 24.

Figure 3:
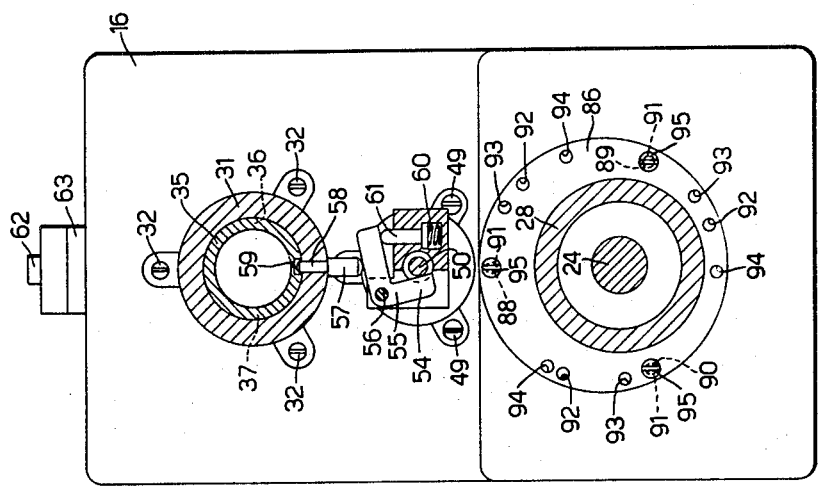
FIG. 3 is a section on the line III—III of FIG. 1.

If the series of holes 91 is placed in correspondence with the threaded holes 88, 89 and 90, it will be possible to mount on the shaft 24 the pinion of greatest diameter, which will enable the highest speed range to be obtained. This situation is shown in FIGS. 1, 2 and 3.

On the other hand, if the series of holes 94 is placed in correspondence with the threaded holes 88, 89 and 90, it will be possible to mount on the shaft 24 a pinion 23 of smaller diameter, that is that pinion which enables the lowest speed range to be obtained. Finally, if the series of holes 92 or 93 is placed in correspondence with the threaded holes 88, 89 and 90, it will be possible to mount on the shaft 24 pinions 23 which enable two intermediate speed ranges to be obtained.

What is claimed is:

1. A speed-changing device comprising a driven rotary member carrying two driven gears angularly fixed to said rotary member and having different diameters, two driving gears for meshing with respective ones of the driven gears and angularly fixed relative to each other, means for orienting said rotary member in a predetermined angular position when said driving gears are stationary, and means for producing a relative axial shifting between said driving gears and said driven gears for selecting which pair of associated driven and driving gears is in mesh, the gear ratios being such and the fixed angular relationships between the driven gears and between the driving gears being such that, when the rotary member 13 is oriented in the predetermined angular position, one gear of each said pair has a tooth aligned exactly with a space of the other gear of the pair.

2. A device according to claim 1, wherein said two driving gears have an overall axial length greater than the axial clearance between the other two gears whereby, when changing speed, one pair of gears commences to mesh before the other pair has ceased to mesh.

3. A device according to claim 1, wherein the transmission ratio of one of the pairs of gears is a whole multiple of the transmission ratio of the other pair, the numbers of teeth on all said gears being whole multiples of the first said whole multiple.

4. A device according to claim 1, wherein said driven gears are fixed axially as well as angularly relative to said rotary member and said two driving gears are integral to each other and slidable axially.

5. A device according to claim 4, wherein said driving gears are themselves driven by a pinion fixed on a driving shaft, said pinion having such a width that it in constant mesh with one of the driving gears.

6. A device according to claim 5, wherein said rotary member is a machine tool spindle, comprising a clutch for actuating said driving shaft, and means operable concomitantly with said orienting means for disengaging said clutch during said alignment.

7. A device according to claim 5, comprising an eccentric mounting said driving shaft and adapted to be fixed in different angular positions, and a plurality of pinions of different diameter adapted to be fixed on said driving shaft to mesh with one of said driving gears.

8. A device according to claim 4, wherein said driving gears are rotatably mounted on an intermediate shaft at a fixed axial position relative thereto, said intermediate shaft being axially shiftable by means of a fluid pressure piston and cylinder actuator coupled thereto.

9. A device according to claim 8, comprising a mechanical interlock between said intermediate shaft and said orienting means such that said intermediate shaft can only be shifted axially upon operation of said orienting means.

10. A device according to claim 9, wherein said orienting means comprise an axially movable cylinder adapted to slide over said rotary member for engaging a projection thereof by two internal converging edges to constrain said projection to rotate into alignment with the point to which they converge, said interlock comprising a lever which is urged normally to engage in one or the other of a pair of annular grooves in a rod fixed to said intermediate shaft, the outer surface of said cylinder being shaped to cam an intermediate element to a position in which it moves said lever out of the engaged groove of said pair when said cylinder has slid fully over said rotary member.

11. A device according to claim 10, wherein a member fixed on said rotary member has a single V-shaped notch in which a positioning member is moved by a fluid pressure actuator to effect fine adjustment of the orientation established by said orienting cylinder.

* * * * *